United States Patent [19]

Kwon

[11] Patent Number: 5,361,080
[45] Date of Patent: Nov. 1, 1994

[54] LIQUID CRYSTAL DISPLAY USING A PLASMA ADDRESSING MODE AND A DRIVING METHOD THEREOF

[75] Inventor: Ki-duck Kwon, Seoul, Rep. of Korea

[73] Assignee: Samsung Electron Devices Co., Ltd., Kyungki-do, Rep. of Korea

[21] Appl. No.: 4,739

[22] Filed: Jan. 14, 1993

[30] Foreign Application Priority Data

Apr. 30, 1992 [KR] Rep. of Korea ............... 92-7405

[51] Int. Cl.$^5$ .................................... G09G 3/28
[52] U.S. Cl. ................................ 345/87; 345/60; 345/208
[58] Field of Search ............... 340/784, 771, 805; 358/236; 345/87, 94, 60, 95, 208

[56] References Cited

U.S. PATENT DOCUMENTS

| | | | |
|---|---|---|---|
| 4,896,149 | 1/1990 | Buzak et al. | 340/771 |
| 5,091,784 | 2/1992 | Someya et al. | 340/784 |
| 5,206,634 | 4/1993 | Matsumoto et al. | 340/784 |

*Primary Examiner*—Richard Hjerpe
*Assistant Examiner*—Lun-Yz Lao
*Attorney, Agent, or Firm*—Lowe, Price, LeBlanc & Becker

[57] ABSTRACT

A liquid crystal display (LCD) using a plasma addressing mode can be applied to the picture display of the two field-technique of an interlaced system used in televisions and whose plasma channels are formed by parallel arranged second electrodes, dielectric lines overlappingly arranged on the second electrodes, and discharge gas injected between the second electrodes. A driving method of the plasma channel is such that discharge occurs according to the potential difference of voltages supplied to two adjacent second electrodes. In scan-driving, one picture consists of two fields, wherein odd and the following even second electrodes as a pair are sequentially enabled to discharge in the first field, and even and the following odd second electrodes as a pair are sequentially enabled to discharge in the second field, thereby decreasing the number of electrodes, facilitating the manufacture of large-sized screens, and simplifying the fabrication process.

9 Claims, 2 Drawing Sheets

ODD FIELD

EVEN FIELD

LIQUID CRYSTAL DISPLAY USING A PLASMA ADDRESSING MODE AND A DRIVING METHOD THEREOF

BACKGROUND OF THE INVENTION

The present invention relates to a liquid crystal display using a plasma addressing mode, and more particularly to a liquid crystal display using a plasma addressing mode and driving method thereof capable of being easily driven when driven by means of interlaced scanning as in a television.

Display devices can be classified into two groups, one of which is cathode ray tubes (CRTs) of an electron gun type. The other is plasma display panels (PDPs), liquid crystal displays (LCDs), electroluminescence displays (ELDs), etc., which have their own field of utilization and are formed so as to be thinner than CRTs, although performance is of yet inferior to the CRT in view of image quality. Among these, a PDP utilizes gas discharge caused by a voltage supplied to a gas in a sealed space. Also, an LCD utilizes alignment properties of the liquid crystal which changes in accordance with the voltage applied to a liquid crystal. In the LCD of a plasma addressing mode, when pixels are formed as X-Y matrices, the X-matrix is composed of liquid crystal and the Y-matrix is composed of plasma. Here, a prior art will be described with reference to FIG. 1.

FIG. 1 is a perspective view showing a conventional LCD using a plasma addressing mode constructed by a faceplate 10, liquid crystal 20, column electrodes 30, a thin glass plate 40, plasma channels 50 and a rear plate 60. Plasma channel 50 includes two parallel electrodes which are perpendicular to column electrodes 30 and provided on a groove 51 injected with discharge gas, etc. Here, one electrode is a scanning electrode 52 supplied with a scanning signal, and the other electrode is a ground electrode 53 connected to ground. That is, in such a conventional structure, a plasma channel for forming one addressing line consists of a groove for containing discharge gas and two electrodes on the groove, which requires fastidious processing. Also, since a spacing between grooves should be regularly maintained in order to prevent leakage, open area ratio is degraded, and manufacture is difficult when enlarging display panel capacity. Moreover, the size of the groove is restricted due to process conditions, so that an individual unit pixel cannot be smaller than a predetermined size, which thus degrades resolution.

SUMMARY OF THE INVENTION

Therefore, it is an object of the present invention to provide a liquid crystal display using a plasma addressing mode, wherein a plasma channel is formed without using grooves to facilitate the fabrication, the number of electrodes forming one address line is reduced to one, different from the conventional technique, to ease the manufacture of larger-capacity display panels, and the size of an individual unit pixel is reduced to enhance resolution.

It is another object of the present invention to provide a method for driving the above described liquid crystal display.

To achieve the above object of the present invention, there is provided a liquid crystal display using a plasma addressing mode comprising:

a transparent faceplate, intermediary plate and rear plate, sequentially arranged and spaced apart from one another;

first electrodes arranged in parallel on the faceplate;

second electrodes arranged in parallel on the rear plate and being spaced apart from one another by a predetermined distance, being perpendicular to the first electrodes;

insulating lines overlappingly arranged on the second electrodes, for insulating the intermediary plate from the second electrodes;

liquid crystal contained between the intermediary plate and the first electrodes; and discharge gas layers injected between the second electrodes, wherein the second electrodes are commonly shared by two adjacent discharge gas layers, thereby creating discharge in the discharge gas layers in accordance with a voltage applied to two adjacent second electrodes.

To achieve another object of the present invention, there is provided a method for driving a liquid crystal display using a plasma addressing mode including a transparent faceplate, intermediary plate and rear plate, sequentially arranged and spaced apart from one another; first electrodes and liquid crystal sequentially arranged between the faceplate and intermediary plate; second electrodes arranged in parallel and being spaced apart frown one another by a predetermined distance between the intermediary and rear plates, and being perpendicular to the first electrodes; insulating lines overlappingly arranged on the second electrodes; and discharge gas layer injected between the second electrodes, comprising the steps of:

constituting one picture with two fields;

sequentially enabling odd electrodes of the second electrodes and then the respectively following even electrodes according to a scanning signal, and causing discharge in plasma addressing lines formed between the enabled odd electrode and the following even electrode simultaneously enabled with the enabled odd electrode, in the first of the two fields constituting the one picture;

sequentially enabling even electrodes of the second electrodes and then the respectively following odd electrodes according to a scanning signal, and causing discharge in plasma addressing lines formed between the enabled even electrode and the following odd electrode simultaneously enabled with the enabled even electrode, in the second of the two fields constituting the one picture; and supplying line-by-line a data signal to the first electrodes, which allows two interlaced fields to form the one picture.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

Figure 1:
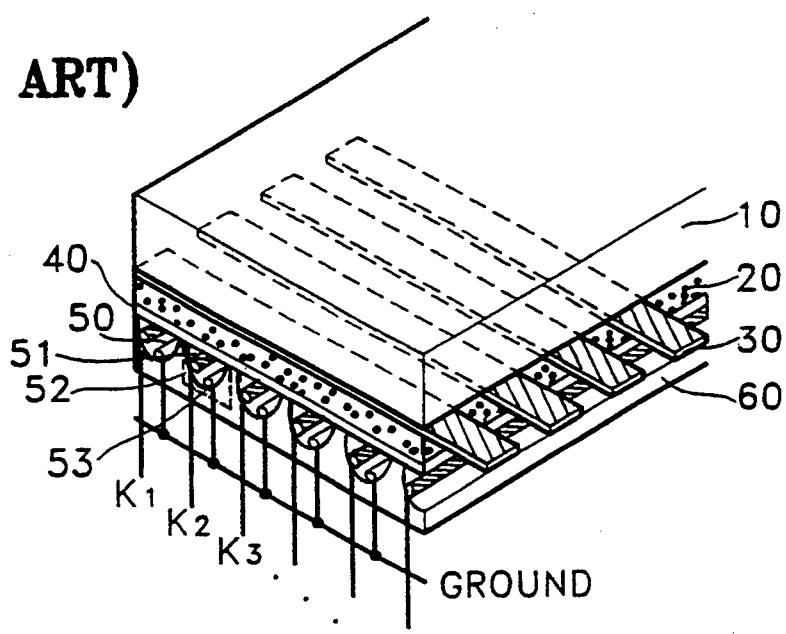
FIG. 1 is a perspective view showing a structure of a conventional liquid crystal display using a plasma addressing mode.
Figure 2:
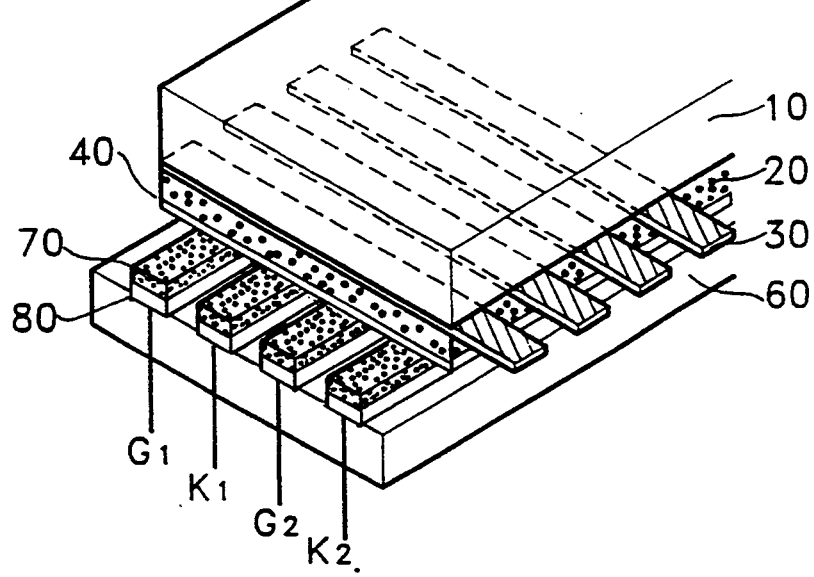
FIG. 2 is a perspective view showing a structure of a liquid crystal display using a plasma addressing mode according to the present invention.

A liquid crystal display using a plasma addressing mode according to the present invention shown in FIG. 2 is constructed by a faceplate 10, first electrodes 30, liquid crystal 20, second electrodes 80, dielectric lines 70, an intermediary plate 40, and a rear plate 60. In more detail, faceplate 10 which is generally composed of glass and protects components for forming the display is placed at the foremost portion thereof. First electrodes 30 formed parallel one another in the same direction and liquid crystal 20 are disposed on the inner surface of faceplate 10. Here, liquid crystal 20 is separated from dielectric lines 70, second electrodes 80, and discharge gas by means of intermediary plate 40. Moreover, second electrodes 80 are spaced apart from one another, and discharge gas is injected between them, so that discharge of the discharge gas occurs in accordance with the potential difference applied to adjacent two second-electrodes. At this time, dielectric lines 70 are overlappingly arranged on second electrodes 80 to sufficiently insulate these electrodes from intermediary plate 40. Second electrodes 80 are formed on rear plate 60.

In this structure, the display of a picture is as follows.

The X-matrix is formed by means of liquid crystal and the Y-matrix is formed by means of plasma channels. Then, an intersecting point formed by crossing the X-matrix and Y-matrix becomes a unit cell, and a pixel is composed of a singular unit cell or plural unit cells. In this case, as described above, plasma discharge occurs in accordance with the potential difference supplied to adjacent two second-electrodes, in which discharge gas serves as a switch for switching between the conducting and insulating states according to a supplied signal. In other words, when discharging, discharge gas becomes conducting, so that an electrical channel is formed from the first electrodes on faceplate 10 to second electrode 80 by way of liquid crystal 20, intermediary plate 40 and the discharge gas layer. Therefore, the alignment of the liquid crystal is altered in accordance with the potential difference supplied thereto, which in turn changes the transmission coefficient of the light. Accordingly, intermediary plate 40 is formed of a thin glass plate for functioning as a capacitor. Also, dielectric lines 70 overlappingly arranged on second electrodes 80 should sufficiently insulate intermediary plate 40 from second electrodes 80, and may be formed of any insulating material other than the dielectric material. At this time, if the dielectric line has no sufficient insulating property, the discharge gas layer cannot function as a switch, thereby impeding desired operation.

The driving operation of the plasma channel in the liquid crystal display using the plasma addressing mode having the above-described structure will be described with reference to FIGS. 3 and 4.

Figure 3:
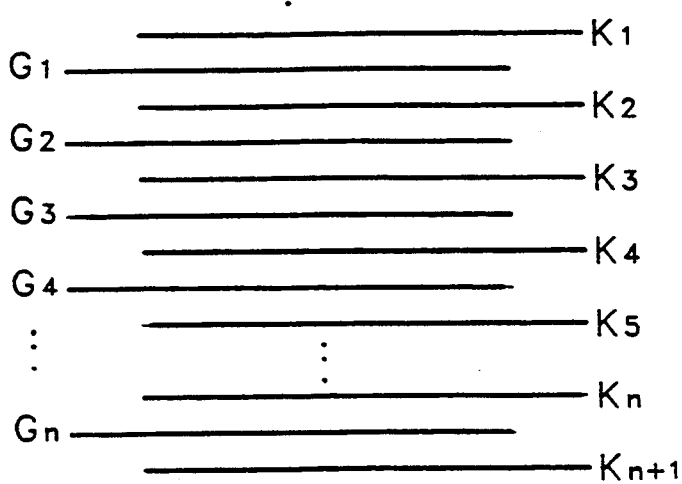
FIG. 3 illustrates the configuration of second electrodes among the electrodes shown in FIG. 2.

FIG. 3 shows the arrangement of the second electrodes. Here, it can be noted that the second electrodes are classified into odd and even numbers. That is, when the odd electrodes are designated by $K_1, K_2, K_3, \ldots, K_{n+1}$, and the even electrodes are designated by $G_1, G_2, G_3, \ldots, G_n$, the driving waveforms of the second electrodes according to the present invention is implemented as shown in FIG. 4.

Figure 4A:
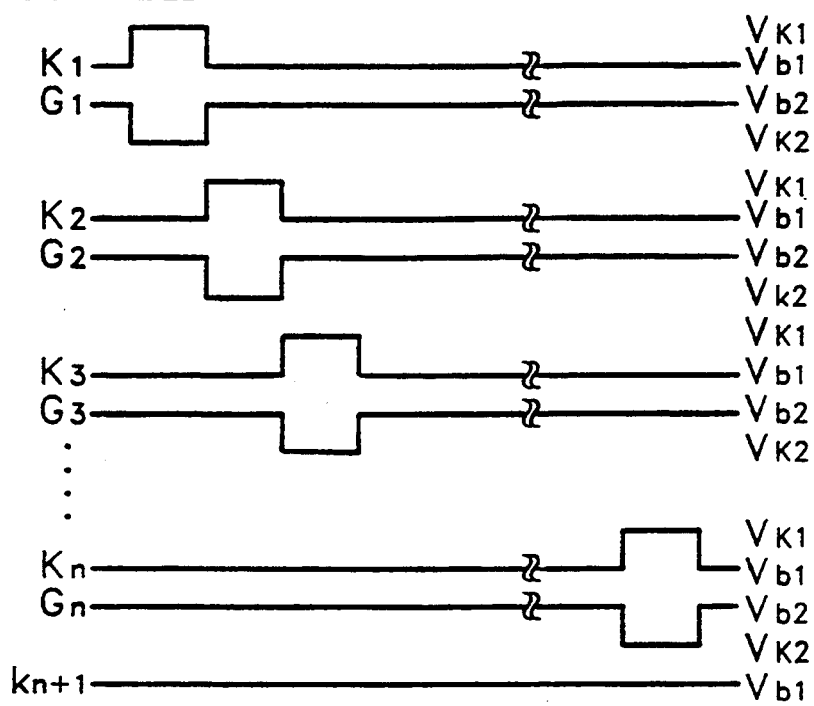
FIG. 4 shows waveforms of voltages supplied to each electrode in FIG. 3.
Figure 4B:
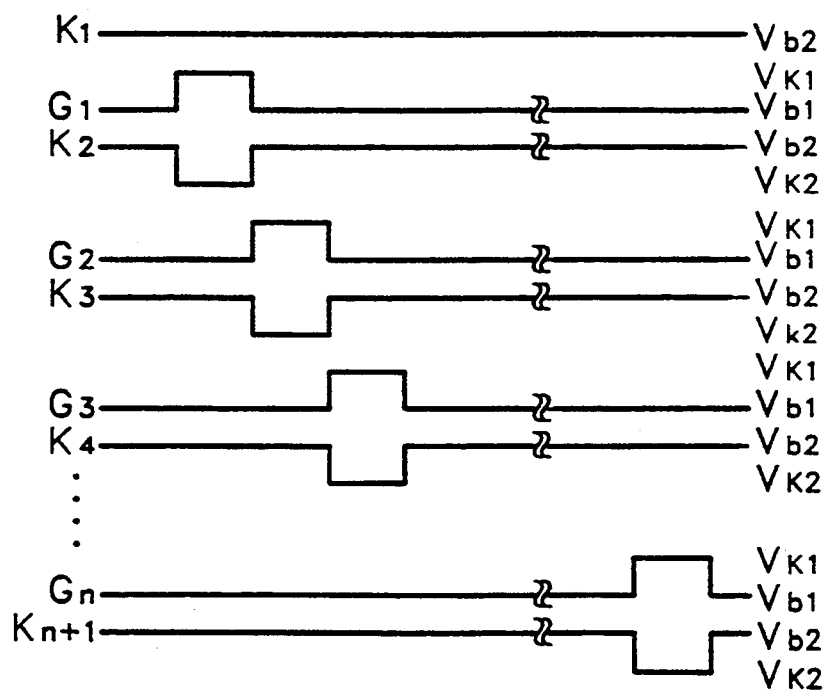

FIG. 4 illustrates driving waveforms of scan electrodes, e.g., the second electrodes, for realizing an interlace driving mode which has been generally utilized in televisions, in a liquid crystal display using a plasma addressing mode wherein the driving waveforms are different from each other in odd and even fields as illustrated in FIG. 4. More specifically, when one picture consists of two fields, in the odd field being the first of the two, odd electrodes $K_1, K_2, K_3, \ldots, K_n$ among the second electrodes and respective even electrodes $G_1, G_2, G_3, \ldots, G_n$ positioned immediately following the corresponding odd electrodes are sequentially enabled in accordance with scanning signals, which causes discharge in a plasma address line formed between the enabled odd electrode and the following even electrode which is simultaneously enabled with the odd electrode. In the even field being the second field of the two, even electrodes $G_1, G_2, G_3, \ldots, G_n$ among the second electrodes and respective odd electrodes $K_2, K_3, \ldots, K_{n+1}$ positioned immediately following the corresponding even electrodes, are sequentially enabled in accordance with scanning signals, which causes discharge in a plasma address line formed between the enabled even electrode and the following odd electrode which is simultaneously enabled with the even electrode. In this two-field technique of the interlaced system, data supplied to the first electrodes arranged on the liquid crystal is also supplied one line at a time. Therefore, "ON" display is performed at just the cell formed at the intersection of the lines where the plasma discharge occurs, and the lines where "ON" data is applied, thereby realizing the X-Y matrix system. Here, the waveforms supplied to the second electrodes in forming one picture with two fields will be described in detail with reference to FIG. 4.

When a scanning signal is supplied in the first field, an odd electrode is supplied with a voltage $V_{K1}$, and the following even electrode is supplied with a voltage $V_{K2}$. Meanwhile, when the scanning selection signal is not supplied, an odd electrode is supplied with a voltage $V_{b1}$ and the following even electrode is supplied with a voltage $V_{b2}$. Here, the voltage level is adjusted in such a manner that the potential difference between voltages $V_{K1}$ and $V_{K2}$ is set to be more than a discharge firing voltage, the potential difference between voltages $V_{K1}$ and $V_{b2}$ and the potential difference between voltages $V_{K2}$ and $V_{b1}$ are set to be below the discharge firing voltage, thereby causing discharge in a selected plasma channel only, while preventing discharge in the adjacent channels.

Using this approach, in the even field (the second field), when a scanning signal is supplied, an even electrode is supplied with voltage $V_{K1}$ and the following odd electrode is supplied with voltage $V_{K2}$. Meanwhile, when the scanning signal is not supplied, an even electrode is supplied with voltage $V_{b1}$, and the following odd electrode is supplied with voltage $V_{b2}$. Here, the potential difference between voltages $V_{K1}$ and $V_{K2}$ is set to be more than a discharge firing voltage, the potential difference between voltages $V_{K1}$ and $V_{b2}$ and the potential difference between voltages $V_{K2}$ and $V_{b1}$ are set to below the discharge firing voltage. 2If the scanning is realized in this manner, the required number of second electrodes is one more than desired scanning lines to be displayed.

As described above, the present invention suggests a structure and driving method for easily displaying the picture of a TV, etc., wherein, as compared with the conventional structure, open area ratio is increased, and the required number of the electrodes are decreased by half so that the size of a unit cell is reduced, which in turn improves the resolution.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A liquid crystal display using a plasma addressing mode comprising:
   a transparent faceplate, intermediary plate and rear plate, sequentially arranged and spaced apart from one another;
   first electrodes arranged in parallel on said faceplate;
   second electrodes arranged in parallel on said rear plate and being spaced apart from one another by a predetermined distance, being perpendicular to said first electrodes;
   insulating lines overlappingly arranged on said second electrodes, for insulating said intermediary plate from said second electrodes;
   liquid crystal contained between said intermediary plate and said first electrodes; and
   discharge gas layers injected between each of said second electrodes,
   wherein each of said second electrodes has two adjacent discharge gas layers, thereby creating discharge in said discharge gas layers in accordance with a voltage applied to two adjacent second electrodes.

2. A liquid crystal display using a plasma addressing mode as claimed in claim 1, wherein said intermediary plate is formed of a thin glass.

3. A liquid crystal display using a plasma addressing mode as claimed in claim 1, wherein said insulating line is a dielectric line composed of a dielectric material.

4. A liquid crystal display using a plasma addressing mode as claimed in claim 1, wherein the number of said second electrodes is one more than the number of scan lines of a picture to be displayed.

5. A method for driving a liquid crystal display using a plasma addressing mode including a transparent faceplate, intermediary plate and rear plate sequentially arranged and spaced apart from one another; first electrodes and liquid crystal sequentially arranged between said faceplate and intermediary plate; second electrodes arranged in parallel and being spaced apart from one another by a predetermined distance between said intermediary and rear plates, and being perpendicular to said first electrodes; insulating lines evenly arranged on said second electrodes; and discharge gas layers injected between each of said second electrodes, comprising the steps of:
   constituting one picture with two fields;
   sequentially enabling odd electrodes of said second electrodes and corresponding even electrodes of said second electrodes according to a scanning signal, and sequentially causing discharge in plasma addressing lines formed between each of said enabled odd electrodes and the corresponding even electrodes, in the first of said two fields constituting said one picture;
   sequentially enabling even electrodes of said second electrodes and corresponding odd electrodes according to a scanning signal, and sequentially causing discharge in plasma addressing lines formed between each of said enabled even electrodes and the corresponding odd electrodes, in the second of said two fields constituting said one picture; and
   supplying line-by-line a data signal to said first electrodes which allows two interlaced fields to form said one picture.

6. A method for driving a liquid crystal display using a plasma addressing mode as claimed in claim 5, wherein, in case of constituting said one picture with two fields, the driving said second electrode in said first field comprises the steps of:
   supplying a voltage $V_{K1}$ to said odd electrode, and a voltage $V_{K2}$ to said following even electrode when supplying a scanning signal; and
   supplying a voltage $V_{b1}$ to said even electrode, and a voltage $V_{b2}$ to said following odd electrode, when not supplying a scanning selection signal,
   such that the potential difference between said voltages $V_{K1}$ and $V_{K2}$ is more than a discharge firing voltage, the potential difference between said voltages $V_{K1}$ and $V_{b2}$ and the potential difference between said voltages $V_{K2}$ and $V_{b1}$ are below said discharge firing voltage.

7. A method for driving a liquid crystal display using a plasma addressing mode as claimed in claim 5, wherein, in case of constituting said one picture with two fields, the driving said second electrode in said second field comprises the steps of:
   supplying voltage $V_{K1}$ to said even electrode, and voltage $V_{K2}$ to said following odd electrode when supplying a scanning signal; and
   supplying voltage $V_{b1}$ to said odd electrode, and voltage $V_{b2}$ to said following even electrode, when not supplying a scanning signal,
   such that the potential difference between said voltages $V_{K1}$ and $V_{K2}$ is more than a discharge firing voltage, the potential difference between said voltages $V_{K1}$ and $V_{b2}$ and the potential difference between said voltages $V_{K2}$ and $V_{b1}$ are below said discharge firing voltage.

8. A liquid crystal display using a plasma addressing mode comprising:
   a transparent faceplate, intermediary plate and rear plate, sequentially arranged and spaced apart from one another;
   first electrodes arranged in parallel on said faceplate;
   second electrodes arranged in parallel on said rear plate perpendicular to said first electrodes and spaced apart from one another by a predetermined distance so as to define a plurality of channels, each between each of said second electrodes;
   insulating lines arranged on said second electrodes, for insulating said intermediary plate from said second electrodes;
   liquid crystal contained between said intermediary plate and said first electrodes; and
   discharge gas injected into each of said plurality of channels,
   wherein a discharge is created in one of said plurality of channels defined by two adjacent ones of said second electrodes in accordance with a voltage applied to the two adjacent ones of said second electrodes.

9. A method for driving a liquid crystal display using a plasma addressing mode including a transparent faceplate, intermediary plate and rear plate sequentially arranged and spaced apart from one another; first electrodes and liquid crystal sequentially arranged between said faceplate and intermediary plate; second electrodes arranged in parallel on said rear plate perpendicular to said first electrodes and spaced apart from one another by a predetermined distance so as to define a plurality of channels, each of said plurality of channels between each of said second electrodes; insulating lines arranged on said second electrodes; and discharge gas injected between each of said second electrodes, comprising the steps of:

constituting one picture with two fields;

sequentially enabling odd electrodes of said second electrodes and corresponding even electrodes of said second electrodes according to a scanning signal, and sequentially causing discharge in plasma addressing lines formed between each of said enabled odd electrodes and the corresponding even electrodes, in the first of said two fields constituting said one picture;

sequentially enabling even electrodes of said second electrodes and corresponding odd electrodes according to a scanning signal, and sequentially causing discharge in plasma addressing lines formed between each of said enabled even electrodes and the corresponding odd electrodes, in the second of said two fields constituting said one picture; and supplying line-by-line a data signal to said first electrodes which allows two interlaced fields to form said one picture.

* * * * *